Nov. 10, 1942.   H. R. BARD   2,301,188
APPARATUS FOR SOLDERING AND SPRAYING CAN BODIES
Filed July 19, 1938
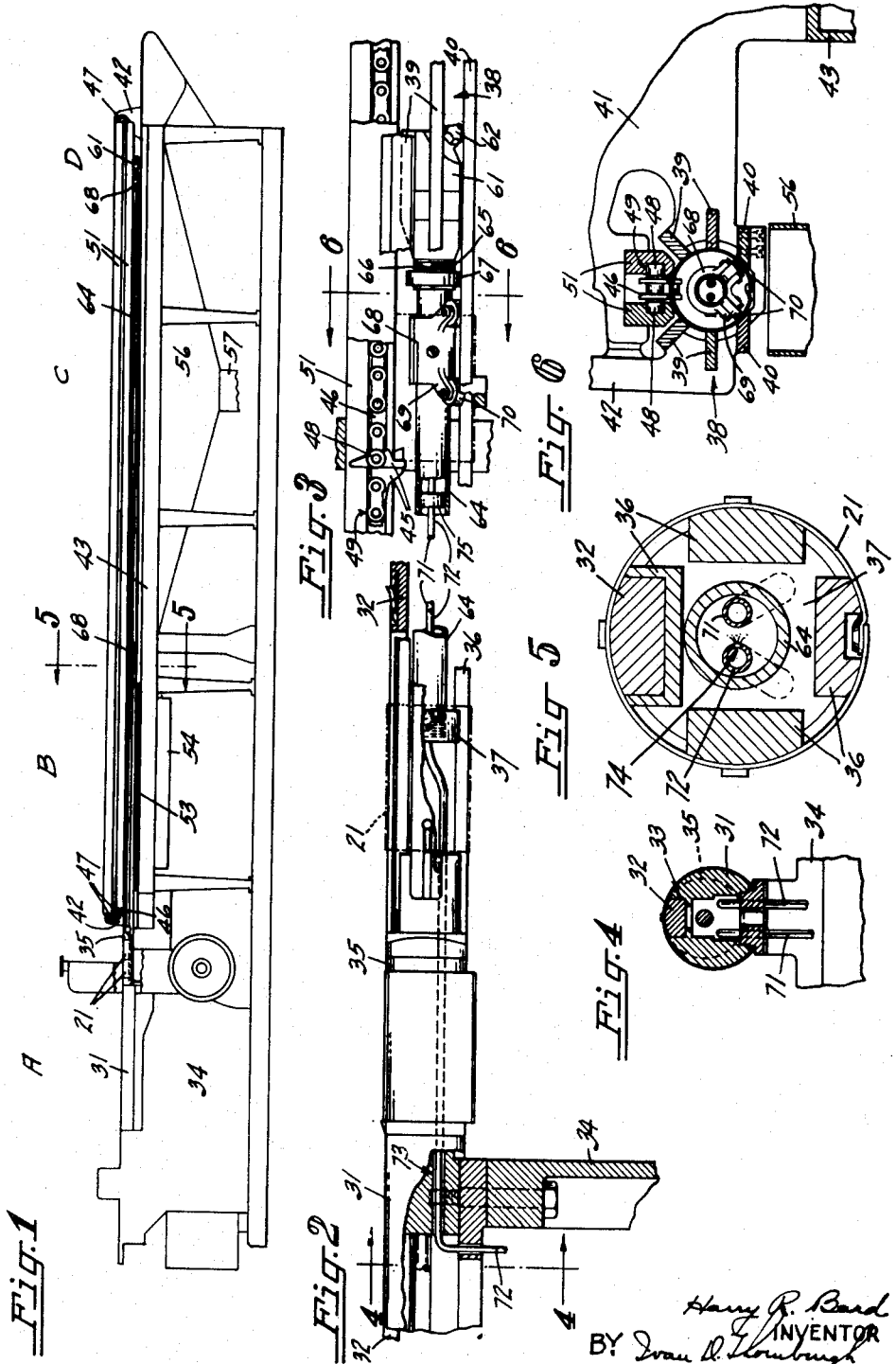

Patented Nov. 10, 1942

2,301,188

UNITED STATES PATENT OFFICE 2,301,188

APPARATUS FOR SOLDERING AND SPRAYING CAN BODIES

Harry R. Bard, Maywood, Ill., assignor to American Can Company, New York, N. Y., a corporation of New Jersey Application July 19, 1938, Serial No. 220,113

2 Claims. (Cl. 113—7)

The present invention relates to a machine for producing a sheet metal soldered side seam can body which is interiorly protected by a film of coating material and has particular reference to cooling the coating material prior to its application to the body so that heat imparted to the material in consequence of soldering the body side seam will be dissipated. This is an improvement over application Serial Number 109,387, filed in the United States Patent Office November 5, 1936, in the name of William M. Holloway, now Patent No. 2,220,107, issued November 5, 1940, for Apparatus for soldering and striping can seams.

In the manufacture of sheet metal containers or cans for the packaging of such products which chemically react with the metal of the can, the interior of the can is usually coated with a lacquer or other suitable coating material to prevent the contents from coming into contact with the metal of the can. This coating material is often applied as two coats, one coat being preferably applied to the flat blank from which the body is made and a second coat after the body is fully formed and soldered.

In applying a coating to the body blank, the side seam edges of the blank are preferably left uncoated so that solder will properly bond with the metal of the body when the side seam is formed and soldered. After the formation of the seam there is some times left a thin line of solder and narrow uncoated surfaces of the can body adjacent the side seam on the inside of the body which are left exposed and are open to attack by the can contents when the can has been filled and sealed. The Holloway method and apparatus locally coats such exposed surfaces after the body is formed and after its side seam has been soldered, to properly protect the seam parts against such attack.

The final coating of the body seam is effected from inside the body and while the latter is supported on a horn or mandrel. For best results this necessitates conveying the coating material through the horn. A portion of the horn is directly over the solder bath and therefore absorbs considerable heat from the bath. The heat in turn is transmitted to the coating material. Certain kinds of coating material when exposed to such heat, have a tendency to carbonize and to break down or disintegrate as in a cracking process and thereby clog up the passageways through which the coating material passes and in other ways interfere with a proper coating action. In some cases, therefore, it has been found desirable to dissipate some of the heat imparted to the coating material.

The present invention contemplates overcoming this difficulty of heating by cooling the coating material as it passes over the solder bath so that it will be reduced in temperature without affecting the soldering heat required to produce a good side seam in the body.

An object of the invention, therefore, is the provision in a machine for coating can bodies having soldered side seams, of devices for cooling the coating material prior to its application to the can bodies so that heat imparted to it in consequence of soldering the body side seam will be dissipated.

Another object is the provision in such a machine of devices for circulating a cooling medium around the intake pipe supplying the coating material to the coating elements so that the coating material will be maintained at a suitable temperature.

Another object is the provision in a machine of this character wherein the cooling medium for the coating material is compressed air or the like fluid taken from the supply line which feeds the coating elements.

Numerous other objects and advantages of the invention will be apparent as it is better understood from the following description, which, taken in connection with the accompanying drawing, discloses a preferred embodiment thereof.

Referring to the drawing:

Figure 1 is a diagrammatic side view of a machine embodying the necessary parts for carrying out the steps of the instant invention;

Fig. 2 is an enlarged fragmentary detail of a portion of can body supporting devices and the included portion of coating or spraying elements, the detail being taken intermediate the ends of the machine near the left in Fig. 1, parts being broken away and shown in section;

Fig. 3 is a detail similar to Fig. 2, showing portions of the same devices and elements as disposed at the end of the machine illustrated at the right in Fig. 1, parts being broken away;

Fig. 4 is a transverse section taken substantially along the line 4—4 in Fig. 2;

Fig. 5 is an enlarged transverse section taken substantially along the line 5—5 in Fig. 1; and Fig. 6 is a transverse section taken substantially along the line 6—6 in Fig. 3.

As a preferred embodiment of the instant invention the drawing illustrates a unitary machine structure (Fig. 1) in which tubular sheet metal can bodies 21 having interfolded and soldered side seams may be produced in a continuous process from blanks to finished bodies as the bodies in their different stages of formation are conveyed from one end of the machine to the other in a continuous procession.

In the machine illustrated in Fig. 1 of the drawing can body blanks are preferably introduced at one end thereof, the left in the figure, which end is preferably designated as a can body forming section A. The blank is moved along a predetermined path of travel in a step by step movement past several working stations each of which performs an operation incidental to the transformation of the blank preferably into a cylindrical can body having an interfolded lock and lap side seam, this being a usual procedure in can manufacture.

At the first of these stations the blank is properly notched along its side seam edges. At subsequent stations the notched blank is bent into body shape, its notched edges formed into hooks for the side seam, the hooked edges brought together into interengagement, and the engaged edges finally bumped or squeezed together to form the side seam.

The formed body is then moved into a side seam soldering section of the machine, this section being indicated by the letter B. Here the formed side seam is brought into engagement with a solder roll which wipes molten solder into the interstices of the seam from the outside of the body. This solder completely fills the seam on the inside of the body along a line adjacent to and between the inside seam and the body wall.

After soldering of the side seam the can body is moved into a cooling section C where the high temperature imparted to it during the soldering operation, is sufficiently dissipated to insure final solidifying of the solder.

The partially cooled can body is then passed through a side seam coating or spraying section D which is disposed at the discharge end of the machine shown at the right in Fig. 1. It is in this section that the side seam on the inside of the body is locally coated preferably by spraying with a lacquer or other suitable coating material to cover up and protect the exposed line of solder.

It is this lacquer which is cooled prior to its application to the can body so that the heat acquired by it from the solder bath will be sufficiently dissipated as the lacquer passes on its way to the spray head.

In one form of such a machine the can body forming section A includes a mandrel or inside horn 31 on which the body is supported and along which it is moved, in its different stages of formation, to the various working stations hereinbefore mentioned. Movement of the bodies along the horn is effected by a feed bar 32 which is disposed in a groove 33 formed in the top of the horn. This feed bar is reciprocated in any suitable manner in time with the other moving parts of the machine.

The horn 31 is mounted on a main frame 34 and is shaped in cross-section to keep the side seam edges of the partially formed can body spaced apart as shown in Fig. 4 until the body has been moved past certain parts of the machine which are supported on the frame. One end of the horn extends beyond the frame and is reduced to a cylindrical cross-section as at 35 (Figs. 1, 2 and 4) so that the side seam edges may be brought together and interfolded in the usual manner to form the side seam.

This can body forming section of the machine is in effect a regular body maker of which there are many suitable and well known constructions in use. The form used in this machine is preferably similar to the one shown in United States Patent 1,875,353 issued September 6, 1932, to John F. Peters, on Can body maker. It is therefore thought that a more detailed description of this section of the machine is unnecessary.

Formed can bodies are passed from the body forming section A to the side seam soldering section B by reciprocation of the feed bar 32. On their way to the section B the bodies are moved along a horn extension comprising a plurality of longitudinal horn bars 36 arranged as shown in Fig. 5. These bars project beyond the end of the reduced diameter portion 35 of the horn 31 and are held in spaced relation at their free ends by a supporting block 37.

The horn bars 36 terminate adjacent the entrance end of the section B and there align with an outside horn 38 to which the formed bodies are transferred by the feed bar 32. The outside horn extends longitudinally of the remaining length of the machine, through the sections B, C and D. This horn comprises a plurality of radially positioned guide bars 39 and horizontal guide bars 40 which are adapted to engage against the outside of the transferred body to guide it through the remaining sections. The guide bars are secured to brackets 41, 42 which are carried on a frame 43 which supports the various devices associated with the machine sections B, C and D.

A formed can body pushed into the outside horn 38 is conveyed the full length thereof by gripper dogs 45 which are carried on an endless conveyor chain 46 disposed over the top of the horn. The chain takes over suitable sprockets 47 (Fig. 1) carried on the brackets 41 and is moved continuously in any suitable manner in time with the other moving parts of the machine. Intermediate the sprockets the chain is supported against sagging by rollers 48 (Fig. 3) which are secured to the sides of the chain at spaced intervals along its length. These rollers engage in horizontal grooves 49 formed in the sides of longitudinal guide plates 51 carried in the brackets 41.

The conveyor chain first moves a formed can body through the machine section B where its side seam is soldered. At this section there is provided a suitable solder roll 53 (Fig. 1) which is located in a bath 54 of molten solder supported on the machine frame 43. The body is conveyed over the top of the solder roll so that the outside of the body wall at the side seam engages against the solder roll and receives an application of molten solder as hereinbefore explained.

The soldered can body is then conveyed through the cooling section C. At this section an elongated sheet metal funnel or duct 56 directs a blast of air against the body as it is moved along the outside horn 38. The funnel is disposed under the horn and is supported on the frame 43. A pipe 57 formed at the small end of the funnel leads to a suitable blower or the like mechanism which is utilized for blowing the air into the funnel. This air may be ordinary atmospheric air at room temperature or it may be refrigerated or otherwise treated as desired.

Near the end of the machine at the section D (Fig. 1) a spraying head or element 61 (Fig. 3) is located inside the horn 38 for locally spraying the inside surface of the side seam as the can body is moved along the horn. The spray head is formed with a nozzle 62 and is adjustably mounted on one end of a long sleeve 64. The end of the head which engages over the end of the sleeve is provided with the usual tapered pipe threads 65 and is cut through with slots 66 so that a clamping collar 67 when turned onto the threads forces the yielding slotted end of the head into tight clamping fit on the sleeve. The head may be turned and set at a desired angle to direct the spray issuing from the nozzle at a predetermined position relative to the body side seam so that the latter will be accurately coated. The sleeve extends back through the full length of the outside horn 38 and along the longitudinal center line of the latter.

The inner end of the sleeve 64 terminates adjacent the inside horn 35 and is threaded into the supporting block 37 (Figs. 2 and 5) of the inside horn extension 36. Intermediate this block and the spray head 61 the sleeve is supported by a plurality of collars 68 (Fig. 3) having lugs 69 carrying rollers 70 which rest upon the horizontal outside horn guide bars 40. This construction permits the passage of a can body along the outside horn 38 without interfering with the spray head supports, the wall of the body readily passing between the horn guide bars 40 and the rollers 70.

The lacquer for spraying the side seam is conducted to the spray head 61 through a conduit or pipe 71 (Figs. 2, 3, 4 and 5) disposed in the sleeve 64. The outer end of the conduit is connected with the spray head while the opposite end extends through a bore formed in the inside horn 31. The inner end of the pipe is bent down inside the frame 34 of the body forming section A at a place where the side seam edges of the partially formed body are still spread apart and leads to a suitable supply of the lacquer.

A similar conduit or pipe 72 is disposed in the sleeve 64 along side of the pipe 71 and is utilized to conduct a supply of compressed air to the spray head 61. The outer end of the air conduit connects with the spray head while the opposite end extends back through the inside horn 31 in a bore 73 formed adjacent to and parallel with the bore through which the lacquer conduit 71 extends. This inner end of the air pipe is bent down inside the frame 34 and leads to a suitable supply of compressed air, such as for example, a pump or storage tank not shown.

The compressed air in the conduit 72 is utilized to cool the lacquer in that section of the pipe line 71 which is located over the solder bath 54. For this purpose the conduit 72 is provided with a bleeder hole or small opening 74 formed in a side thereof and located just in back of the solder bath. Compressed air on its way to the spray head 61 escapes from this opening and impinges against the lacquer pipe line.

Since the outer end of the long sleeve 64 surrounding the pipe line and the conduit is closed off by a trap or block 75 (Fig. 3) located in the sleeve, the air from the bleeder hole escapes into the sleeve and circulates around the pipe line, passing back over the solder bath section of the sleeve and out of its open inner end. It is this circulation of air around the lacquer pipe line which dissipates the heat acquired from the solder bath within the long sleeve 64 and thus keeps the lacquer from overheating.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for producing can bodies having soldered side seams, the combination of a horn for supporting the can bodies, a solder bath adjacent said horn, means for advancing can bodies along said horn and past said solder bath, a coating material supply pipe disposed inside said horn and leading to a spray head disposed adjacent one end of said horn for spraying a film of coating material in strip form on the interior surface of the soldered side seams as the cans advance along said horn, a conduit for supplying compressed gas to said spray head for the spraying operation, said gas conduit being disposed adjacent said coating material supply pipe and having an opening therein through which the gas is projected against said supply pipe to cool the latter with its enclosed coating material to substantially dissipate the heat transmitted to the coating material by said solder bath.

2. In an apparatus for producing can bodies having soldered side seams, the combination of a horn for supporting the can bodies, a solder bath adjacent said horn, means for advancing can bodies along said horn and over said solder bath, a coating material supply pipe disposed inside said horn and leading to a spray head disposed adjacent one end of said horn for spraying a film of coating material in strip form on the interior surface of the soldered side seam areas as the cans advance along said horn, a pipe disposed in substantially parallel relation to said coating material supply pipe for supplying air under pressure to said spray head for the spraying operation, a tubular member within the horn enclosing said pipes, said compressed air supply pipe having a plurality of spaced openings therein through which air escapes into said tubular member and projects against said coating material supply pipe to provide a confined cooling medium for circulation around said supply pipe over said solder bath, whereby the heat of said solder bath will be substantially dissipated and removed from the coating material flowing to said spray head.

HARRY R. BARD.